ated Nov. 21, 1967

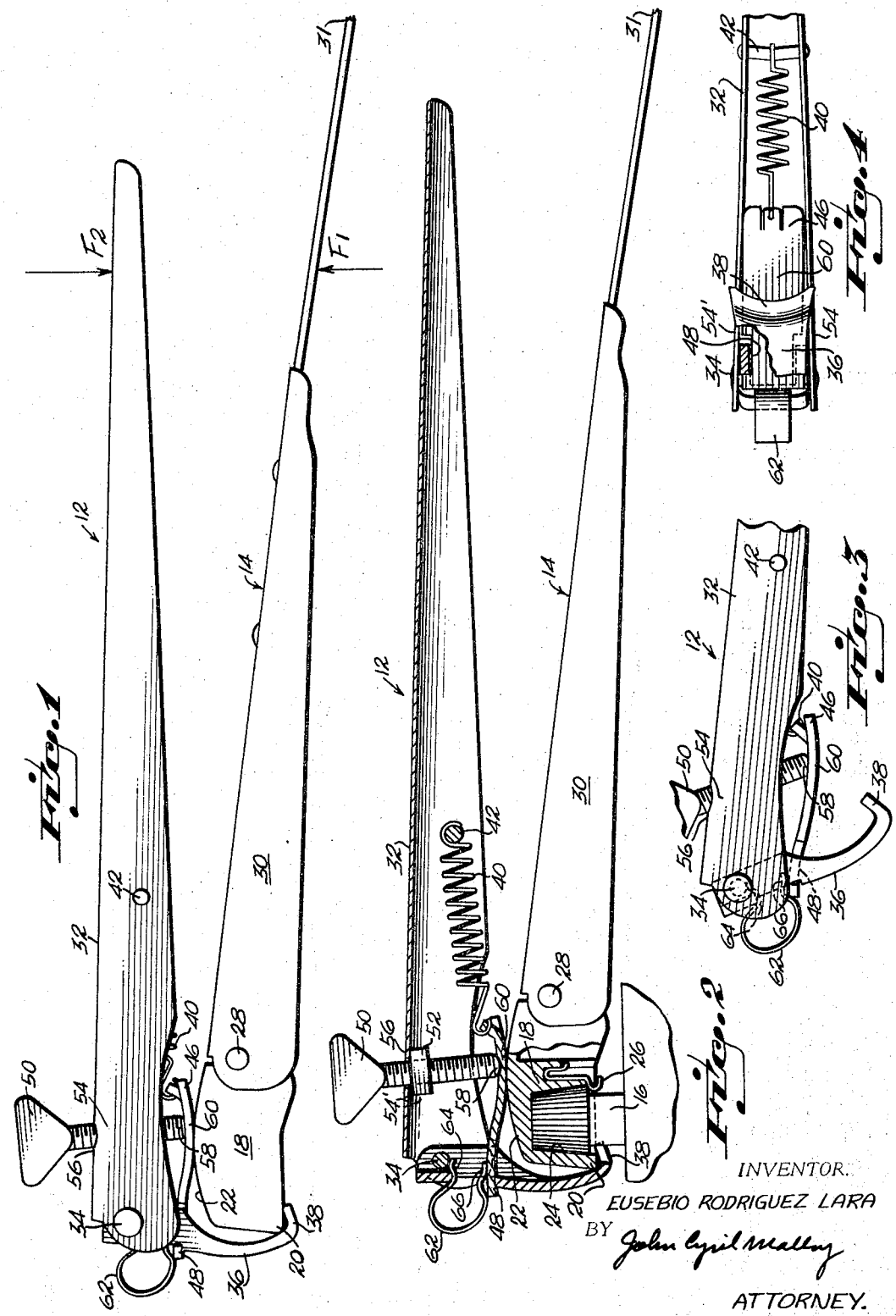

United States Patent Office 3,353,253
Patented Nov. 21, 1967

3,353,253
TOOL FOR INSTALLING ASSEMBLIES TO CARRY WINDSHIELD WIPER BLADES
Eusebio Rodriguez Lara, 4660 NW. 4th St., Apt. 4, Miami, Fla. 33126
Filed July 7, 1966, Ser. No. 563,474
10 Claims. (Cl. 29—239)

This invention relates to a tool for use in removing and installing the assemblies to which automobile windshield wipers are connected.

As is perhaps well known, it is quite a difficult task to remove the assembly which carries the windshield wiper blade from an automobile for the reason that an inverted cup-shaped portion is carried on the assembly to rotate with a driven stud and this cup-shaped portion is pivotally connected and spring biased with respect to an elongate arm which remains level making it extremely difficult to balance the forces between the cup and the driven stud so that the cup can be removed straight up from the top or roof of the stud. The instant invention has as an object the provision of a tool for removing the assemblies of windshield wiper blades which includes a first and a second pivotally connected lever, one of which levers is provided with a hook end to engage the rim of the cup of the assembly and the other lever is adapted to overlay the main stem of the windshield wiper blade assembly and means are connected between the levers to adjust on the crown of the cup so that it may be manipulated and removed without difficulty.

It is another object of this instant invention to provide a device of the type described hereinafter which is simple in construction, inexpensive to manufacture, and is otherwise well adapted for the purposes for which it is intended.

In accordance with these and other objects which will become apparent hereinafter, the instant invention will now be described with reference to the accompanying drawing illustrating a preferred embodiment thereof.

In the drawings:

FIGURE 1 is a side elevation view of the instant tool and connected to a windshield wiper blade assembly;

FIGURE 2 is a view similar to that of FIGURE 1 in cross section and illustrating the details of the instant invention;

FIGURE 3 is a view similar to FIGURE 1 and illustrating the tool in the relaxed attitude when it is not connected for installation or removal of the windshield wiper blade assembly; and FIGURE 4 is a bottom plan view of FIGURE 3 which is partially broken away for clarity.

Referring more particularly to the drawings, wherein like reference characters designate like or corresponding parts throughout the different views, and referring particularly to FIGURE 1, the numeral 12 generally designates the tool and the numeral 14 generally designates the assembly to which a windshield wiper blade is connected on an automobile vehicle. Referring first to the assembly 14, which forms no part of the instant invention, the same is customarily mounted over a rotatably driven stud 16 and includes a cup-shaped portion 18 having a lip 20 and a crown 22 with an interior pocket or chamber 24 into which the main body of the stud is snugly received and held in position by suitable spring means such as that indicated by the numeral 26. The cup-shaped portion 18 is pivotally connected as at 28 to an extension arm 30 on which the blade itself is mounted. Spring means, not shown, resiliently urge the distalmost end 31 of the arm toward the cup, that is, there is a tendency for the cup and the arm to bow or pivot towards one another which is caused by spring means.

The tool of the instant invention is seen in the relaxed position in FIGURE 3, and in FIGURE 4 is seen to include a main handle lever 32 which is pivotally connected at one end thereof by pivot means 34 to one end of a shorter lever 36, which shorter lever extends from the pivot means 34 a radial distance slightly larger than the height of the cup of the assembly. The distal end 38 of the shorter lever 36 is of hook form to nestle beneath the rim 20 of the cup 18 with the cup being between the hook end and the handle lever 32 when the levers are in generally right angle relation as shown in FIGURE 1. Resilient means 40 are provided to connect the handle as by the transverse pin 42 to the short lever to normally urge it in the position of rest seen in FIGURE 3 and yieldable so that the distal end or hook end 38 may be drawn into the relation with respect to the handle lever seen in FIGURE 1. Thus, it is seen that the cup-shaped portion 18 is adapted to be received in the bite of the levers and to be held in position by the hook end 38. So long as the forces F1 and F2 are applied as indicated to the right-hand side of FIG. 1, the arm 30 will not spring away from the handle lever 32, because of spring of the wiper blade assembly, so that it will not pivot about 28 downwardly out of the position shown in FIG. 1, but will in effect become a second long handle of the tool. Means are provided to adapt the tool to the variations of cup-shaped members 18 which are encountered on the various types of cars; in FIG. 1 the means comprise the member 46 which is pivotally connected as at 48 to the short lever for a limited range of angular adjustment between the levers. The angular adjustment is achieved by means of a screw 50 which may be turned with respect to a nut 52 captivated on the lever handle 32. In the embodiment shown, the nut is between the side edges 54 and 54' and against the web 56 of the lever handle so that the end 58 of the screw adjustably bears on the central zone 60 of the member 46 and may be threadably traveled to pivotally vary the angular position of the member 46 with respect to the short lever with the spring 40 permitting the member 46 to so pivot. Thus, there is effected an adjustable member 46 to accommodate the tool to the various type cups on the windshield wiper assemblies. It will be noted that the reversely bent leaf spring 62 normally urges the member 48 into the position shown in FIG. 3 since one end 64 bears on the pivot pin 34 and the other end 66 bears on the member 46 at a position offset with respect to its connection to the short lever.

In operation, a user merely connects the tool which is ordinarily in the position shown in FIG. 3 to the windshield wiper blade assembly as it is seen in FIG. 1 and by maintaining the forces F1 and F2 in balance may readily install the assembly on the stud of an automobile or, if it is already installed on an automobile, simply remove it from the automobile in this manner. Thus, the instant tool is adapted to be utilized for the purpose of installing or removing the assembly from an automobile vehicle and in effect utilizes the arm 30 of the assembly 14 as a lever in combination with the lever 12 so that the tool may be held together as by a rubber band around the ends of the arm 30 and the lever 12 to supply the forces indicated by the arrowed lines F1 and F2.

While the instant invention has been shown and described herein in what is conceived to be the most practical and preferred embodiment, it is recognized that departures may be made therefrom within the scope of the invention, which is therefore not to be limited to the details disclosed herein but is to be accorded the full scope of the claims so as to embrace any and all equivalent apparatus and articles.

What is claimed is:

1. A tool to either install or remove an assembly for a windshield wiper blade from a vehicle which assembly includes an inverted cup-shaped portion pivotally connected to an arm and spring means biasing the arm and the cup-shaped member so that the opening in the cup and the distal end of the arm are urged in arcuate paths toward one another comprising: an elongate lever handle to overlay the arm of the assembly and a short lever at one end of the elongate lever with pivot pin means to connect a short lever and the elongate lever, said short lever extending from the axis of the pivot pin means a distance at least as large as the height of the cup-shaped portion and hook means on the distal end of the short lever to engage the rim of the cup-shaped portion to captivate the cup-shaped portion within the angle between the levers so that the arm of the assembly and the lever may be arranged in parallel relation and maintained in such relation by minimal opposing forces on the distal ends of the arm and elongate handle while the cup is restrained from pivotal movement with respect to the arm by reason of the hook end of the short lever.

2. A tool as set forth in claim 1 wherein means are provided on the tool to extend between the elongate and short lever with one end being pivotally connected to the tool and the other end adjustable to vary the distance between the hook-shaped distal end and the longitudinal center line of the arm when the said levers are in right angle relation and said means to extend including means to restrain pivotal movement of the adjustable other end of said means to extend and, thereby to hold the cup-portion of a blade assembly in the bite of the tool between said means to extend and the hook means when the arm and elongate lever extend from the pivot pin means a common direction.

3. A tool as set forth in claim 2 wherein a spring is connected to said other end and said spring is connected to said elongate lever to hold the other end of said means to extend in a normal position closely adjacent the elongate lever.

4. A tool as set forth in claim 3 wherein said one end of the means to extend is pivotally connected to the short lever of the tool and a threaded screw is carried in the elongate handle with the screw extending into the bite and into engagement with said means to extend at a point intermediate the said one end and the said other end whereby threaded movement of the screw is adapted to adjust the angular position of the means to extend in the bite between the levers.

5. A tool as set forth in claim 4 wherein spring means are provided to hold the said one end of the means to extend in pivotal engagement with the short lever and in a predetermined normal position with respect to said short lever.

6. A tool as set forth in claim 5 wherein said spring means comprise a reversely bent leaf spring with one end extending in a slot in said short lever and against said pivot means and the other engaging and holding said one end of the means to extend against the said short lever.

7. A tool as set forth in claim 2 wherein said short lever is provided with a slot adjacent the pivotal connection to the elongate lever and said one end of the means to extend is pivotally connected in said slot in the short lever and includes ears laterally extending on one side of the short lever and a constricted portion which nestles between the sides of the slot and permits of limited pivotal movement of the member in the slot with a line connecting the ears comprising the axis of pivotal movement and spring means are provided to hold said one end of the means to extend in pivotal engagement with the short lever and to hold the ears in a predetermined normal position in the slot of the short lever.

8. A tool as set forth in claim 7 wherein a spring is connected to said other end and said spring is connected to said elongate lever to hold the other end of said means to extend in a normal position closely adjacent the elongate lever.

9. A tool as set forth in claim 8 wherein a threadable screw is carried in the elongate handle with the screw extending into the bite and into engagement with said means to extend intermediate the said one end and the said other end whereby threaded movement of the screw is adapted to adjust the angular position of the means to extend between the levers.

10. A tool as set forth in claim 9 wherein said spring means comprises a reversely bent leaf spring with one end extending in the slot in said short lever and against said pivot means and the other end extending into said slot and holding said means to extend against the floor of the slot.

References Cited
UNITED STATES PATENTS

| | | | |
|---|---|---|---|
| 1,728,418 | 9/1929 | Litchfield | 81—3.38 |
| 2,455,752 | 12/1948 | Geh | 81—3.38 |
| 3,071,849 | 1/1963 | Krohm | 29—270 |

OTHELL M. SIMPSON, *Primary Examiner.*

J. C. PETERS, *Assistant Examiner.*